United States Patent
Hayashi et al.

(10) Patent No.: US 7,723,250 B2
(45) Date of Patent: May 25, 2010

(54) CERAMIC POROUS BODY AND METHOD FOR PRODUCING MOLDED BODY

(75) Inventors: Shinzou Hayashi, Obu (JP); Hiroyuki Suenobu, Nagoya (JP); Hirotake Yamada, Anjyo (JP); Yasushi Noguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/593,331

(22) PCT Filed: Mar. 24, 2005

(86) PCT No.: PCT/JP2005/005341

§ 371 (c)(1),
(2), (4) Date: Sep. 19, 2006

(87) PCT Pub. No.: WO2005/090263

PCT Pub. Date: Sep. 29, 2005

(65) Prior Publication Data

US 2007/0225149 A1    Sep. 27, 2007

(30) Foreign Application Priority Data

Mar. 24, 2004   (JP) .............................. 2004-085915
Dec. 24, 2004   (JP) .............................. 2004-374326

(51) Int. Cl.
  C04B 35/03  (2006.01)
  B01D 39/06  (2006.01)
  B28B 1/00   (2006.01)
  B28B 3/00   (2006.01)
  B28B 5/00   (2006.01)
  B28B 33/32  (2006.01)
  C04B 33/32  (2006.01)
  C04B 33/36  (2006.01)
  C04B 35/64  (2006.01)

(52) U.S. Cl. ........................ 501/119; 55/523; 264/631

(58) Field of Classification Search ................ 501/119; 55/282.2, 282.3, 385.3, 523; 264/631
See application file for complete search history.

(56) References Cited

U.S. PATENT DOCUMENTS

| 3,203,760 | A | * | 8/1965 | Winyall .................... 423/338 |
| 5,264,200 | A | * | 11/1993 | Felthouse et al. ........... 423/522 |
| 5,976,478 | A | * | 11/1999 | Swanson et al. ............ 423/335 |
| 6,541,407 | B2 | * | 4/2003 | Beall et al. ................. 501/119 |
| 2002/0169065 | A1 | | 11/2002 | Kawazu et al. |

FOREIGN PATENT DOCUMENTS

| JP | A-61-127682 | 6/1986 |
| JP | A-05-213681 | 8/1993 |
| JP | A-10-099696 | 4/1998 |
| JP | A-2002-274974 | 9/2002 |
| JP | A-2002-326879 | 11/2002 |
| JP | A-2003-238271 | 8/2003 |

OTHER PUBLICATIONS

Material Safety Data Sheet: ALUSILICA. Alufluor. Jun. 8, 2007.*
Diatomaceous Eart (DE). Reade Advanced Materials. www.reade.com/products/minerals_and_ores/diatomaceous_earth.html. Accessed: May 1, 2009.*

* cited by examiner

*Primary Examiner*—C. Melissa Koslow
*Assistant Examiner*—Matthew E Hoban
(74) *Attorney, Agent, or Firm*—Oliff & Berridge, PLC

(57) ABSTRACT

A ceramic porous body including at least Si as a chemical component, the ceramic porous body being obtained by adding a porous silica powder or a porous silica-containing compound powder to a forming raw material to prepare a clay, forming the resulting ceramic clay into a specific shape, and firing the formed product. The ceramic porous body according to the present invention does not produce carbon dioxide or toxic gas during firing and allows the firing time to be reduced in comparison with the case of using a resin powder or a carbon powder as a pore-forming agent by using the porous silica powder or the porous silica-containing compound powder as the pore-forming agent during production. Moreover, a change in pore-forming characteristics or deformation of a formed product rarely occurs.

16 Claims, 1 Drawing Sheet

CERAMIC POROUS BODY AND METHOD FOR PRODUCING MOLDED BODY

TECHNICAL FIELD

The present invention relates to a ceramic porous body used for filters, catalyst carriers, and the like. More particularly, the present invention relates to a ceramic porous body which does not produce a toxic gas during production and rarely causes a change in pore-forming characteristics or deformation of a formed product.

BACKGROUND ART

A ceramic porous body has been widely used for filters, catalyst carriers, and the like. For example, the ceramic porous body has been used for an exhaust gas purifying device provided in a heat engine such as an internal combustion engine or combustion equipment such as a boiler, a liquid fuel/gaseous fuel reforming device, a service water/sewage purification device, and the like. The ceramic porous body is generally obtained by adding a pore-forming agent to a ceramic powder, adding a binder, forming agent, water, and the like to the mixture, kneading the resulting mixture, forming the kneaded product into a specific shape, and firing the formed product. The pore-forming agent is used to increase pores in the ceramic porous body and control the size and the number of pores.

As the pore-forming agent used to produce the ceramic porous body, a resin powder or a carbon powder which is burned during firing has been generally used. However, such a powder increases the firing time or produces carbon dioxide or toxic gas during firing due to high combustible content.

In order to prevent the above problems, attempts have been made to use hollow resin particles such as a resin foam or water-swellable particles such as crosslinked starch as the pore-forming agent (e.g. patent documents 1 and 2). However, the hollow resin particles are easily crushed during kneading, deaerating, or forming, whereby desired pore-forming characteristics may not be achieved. In particular, when integrally forming a hard formed product or producing a formed product using a continuous forming machine, the hollow resin particles such as a resin foam exhibiting poor mechanical strength are easily crushed, thereby making it difficult to obtain a ceramic porous body with a high porosity. When using the water-swellable particles, a problem does not occur in which the particles are crushed. However, since the combustibles cannot be eliminated, a problem similar to that arising when using the carbon powder or the like occurs to a certain extent.

[Patent document 1] JP-A-2002-326879

[Patent document 2] JP-A-2003-238271

DISCLOSURE OF THE INVENTION

The present invention has been achieved in view of the above-described situation. An object of the present invention is to provide a ceramic porous body which prevents an increase in the firing time or production of toxic gas or the like due to combustibles in a pore-forming agent during production and rarely causes a change in pore-forming characteristics or deformation of a formed product.

In order to achieve the above object, the present invention provides a ceramic porous body comprising at least Si as a chemical component, the ceramic porous body being obtained by adding a porous silica powder or a porous silica-containing compound powder to a forming raw material to prepare a clay, forming the resulting ceramic clay into a specific shape, and firing the formed product (first ceramic porous body).

The present invention also provides a ceramic porous body comprising at least Si as a chemical component, the ceramic porous body being obtained by adding silica gel granules with a 50% particle size ($D_{50}$) of 10 to 100 μm to a forming raw material to prepare a clay, forming the resulting ceramic clay into a specific shape, and firing the formed product (second ceramic porous body).

The present invention also provides a method of producing a formed product which produces a ceramic porous body upon firing, the method comprising adding silica gel granules or silica gel granules and water-absorbing polymer particles to a forming raw material to prepare a clay, and integrally forming the resulting ceramic clay into a formed product (first method of producing a formed product).

The present invention further provides a method of producing a formed product which produces a ceramic porous body upon firing, the method comprising adding silica gel granules or silica gel granules and water-absorbing polymer particles to a forming raw material to prepare a clay, and forming the resulting ceramic clay into a formed product using a continuous forming machine (second method of producing a formed product).

The first ceramic porous body according to the present invention does not produce carbon dioxide or toxic gas during firing and allows the firing time to be reduced in comparison with the case of using a resin powder or a carbon powder as the pore-forming agent by using the porous silica powder or the porous silica-containing compound powder as the pore-forming agent during production. Moreover, a change in pore-forming characteristics or deformation of a formed product rarely occurs. The second ceramic porous body according to the present invention does not produce carbon dioxide or toxic gas during firing, allows a reduction in the firing time, and rarely causes a change in pore-forming characteristics or deformation of a formed product in the same manner as the first ceramic porous body by using the silica gel granules with a specific 50% particle size ($D_{50}$) as the pore-forming agent during production. According to the first and second methods of producing a formed product according to the present invention, since the silica gel or the water-absorbing polymer particles, which are not easily crushed during kneading, deaerating, or forming and rarely cause deformation of a formed product, are used as the pore-forming agent during production, the pore-forming agent is not crushed even if a formed product is integrally formed or produced using a continuous forming machine, whereby a ceramic porous body which exhibits a high porosity and does not show defects such as deformation can be obtained by firing the resulting formed product.

BEST MODE FOR CARRYING OUT THE INVENTION

Figure 1:
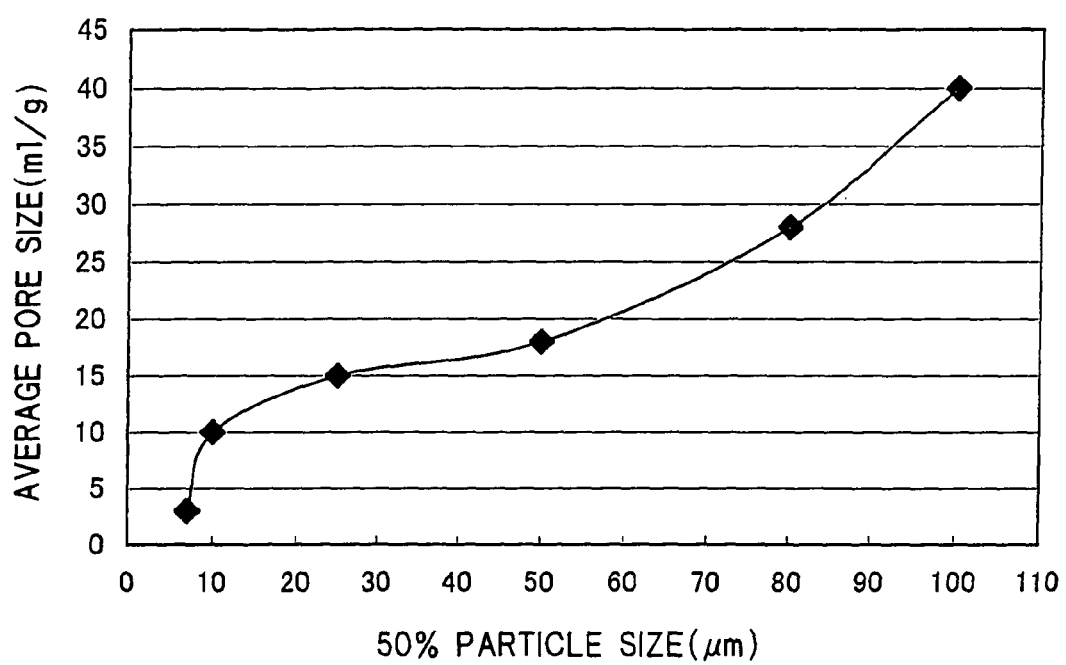
FIG. 1 is a graph showing the relationship between the 50% particle size of a pore-forming agent and the average pore size of a porous body.

The first ceramic porous body according to the present invention is a ceramic porous body including at least Si as a chemical component, the ceramic porous body being obtained by adding a porous silica powder or a porous silica-containing compound powder to a forming raw material to prepare a clay, forming the resulting ceramic clay into a specific shape, and firing the formed product.

The porous silica powder and the porous silica-containing compound powder used for the first ceramic porous body according to the present invention are added to the forming raw material as a pore-forming agent when producing the ceramic porous body. Since these powders are inorganic powders which do not contain combustibles which are burned during firing, production of carbon dioxide or toxic gas due to combustibles in the pore-forming agent does not occur during firing the formed product, differing from the case of using a resin powder, carbon powder, or water-swellable particles as the pore-forming agent. Moreover, the firing time can be reduced in comparison with the case of using a resin powder or carbon powder as the pore-forming agent. Since these powders exhibit a high strength and are not easily crushed, differing from the hollow resin particles, the pore-forming characteristics do not change during forming.

The first ceramic porous body according to the present invention must be a ceramic porous body including at least Si as the chemical component, such as cordierite, since the porous silica powder or the porous silica-containing compound powder is used as the pore-forming agent. The forming raw material is added at a desired composition after adding a specific amount of the pore-forming agent.

It is preferable that the porous silica powder used for the first ceramic porous body be an amorphous silica powder. In more detail, a silica gel may be suitably used as the porous silica powder. It is preferable that the porous silica-containing compound powder used for the first ceramic porous body be an amorphous silica-containing compound powder. As the compound, a compound of a cordierite composition may be preferably used, for example.

It is preferable that the porous silica powder and the porous silica-containing compound powder used for the first ceramic porous body have a bulk density of 1 g/cm$^3$ or less, and still more preferably 0.2 to 1 g/cm$^3$. If the powder has a bulk density exceeding 1 g/cm$^3$, since the powder exhibits a decreased pore-forming function, it is difficult to obtain a desired porous body. If the powder has a bulk density of less than 0.2 g/cm$^3$, since a large amount of shrinkage occurs during firing near the melting point of the powder component, the pore-forming function deteriorates (porosity decreases) or cracks occur in the formed product.

The term "bulk density" used herein means the bulk density measured using a powder tester "PT-R" manufactured by Hosokawa Micron Corporation.

The porous silica powder and the porous silica-containing compound powder used for the first ceramic porous body are added in an amount of preferably 40 vol % or less, and still more preferably 5 to 40 vol % of the total amount of the forming raw material after the addition of the powder. The porosity of the resulting ceramic porous body increases accompanying an increase in the amount of powder added until the amount of powder reaches about 40 vol % of the total amount of the forming raw material. On the other hand, when the amount of powder exceeds 40 vol % of the total amount of the forming raw material, the amount of shrinkage of the formed product during firing increases, whereby the porosity tends to decrease. If the amount of powder added is less than 5 vol % of the total amount of the forming raw material, since the effect of increasing the porosity is small, the addition of powder does not lead to a sufficient advantage.

The powder used as the pore-forming agent is added to the forming raw material such as a ceramic powder. After the addition of a binder, forming agent, water, and the like, the mixture is kneaded to prepare a clay. After forming the ceramic clay into a specific shape, the formed product is fired to obtain a ceramic porous body according to the present invention.

When using the porous silica powder or the porous silica-containing compound powder as the pore-forming agent, the powder is generally melted during firing and reacts with other components of the forming raw material to form a silica-containing compound. For example, when the forming raw material and the porous silica powder as the pore-forming agent are mixed at a cordierite composition, the melted silica powder reacts with other components of the forming raw material during firing to form a compound of the cordierite composition and remain in the resulting ceramic porous body.

The second ceramic porous body according to the present invention is a ceramic porous body including at least Si as a chemical component, the ceramic porous body being obtained by adding silica gel granules with a 50% particle size ($D_{50}$) of 10 to 100 µm to a forming raw material to prepare a clay, forming the resulting ceramic clay into a specific shape, and firing the formed product.

The silica gel granules used for the second ceramic porous body are added to the forming raw material as the pore-forming agent when producing the ceramic porous body, and have a 50% particle size ($D_{50}$) of 10 to 100 µm. A problem which occurs when using combustibles as the pore-forming agent, such as cracks, an increase in the firing time, or production of carbon dioxide or toxic gas, can be prevented by using the silica gel which is an inorganic porous material as the pore-forming agent. Since the silica gel is a porous particle and exhibits an excellent pore-forming effect per unit mass in the same manner as the hollow resin particles, a porous body with a high porosity can be obtained by adding only a small amount of silica gel. On the other hand, since the silica gel exhibits a high mechanical strength in comparison with the hollow resin particles, the silica gel particles are rarely crushed during mixing/kneading the raw materials or during forming. Therefore, pore-forming effects can be obtained to an extent corresponding to the amount of the silica gel added.

The silica gel is a xerogel which has a three-dimensional network skeleton, in which main-component monosilicic acid ($SiO_2 \cdot nH_2O$) molecules are bonded, and in which a number of minute pores are formed in the three-dimensional network skeleton. In the second ceramic porous body, granules of such silica gel are used as the pore-forming agent. The term "granule" used herein does not necessarily mean a granulated particle, and also includes a substance generally called a powder.

In the second ceramic porous body, the silica gel contains monosilicic acid as the main component, and may contain other components insofar as the effects of the present invention are not impaired. The silica gel preferably has such a high Si content that Si accounts for 95 to 99.99 mol % of the metal elements forming the silica gel.

Components such as an acid or alkali added when producing the silica gel may remain in the silica gel in addition to silica as the main component. If a large amount of such components remain so that the Si content is less than the above range, a formed product (sintered product) including the pore-forming agent may shrink to a large extent when firing the formed product.

The Si content may be calculated using a known analytical method and device such as a gravimetric method and an X-ray fluorescence spectrometer (XRF). Note that the Si content used herein indicates the value calculated using the gravimetric method.

The silica gel granules used for the second ceramic porous body must have a 50% particle size ($D_{50}$) of 10 to 100 µm. The silica gel granules preferably have a 50% particle size ($D_{50}$) of 10 to 80 µm, and still more preferably 10 to 50 µm. If the 50% particle size is within the above range, a porous body with a practical average pore size can be obtained.

If the 50% particle size is outside the above range, since the resulting porous body exhibits a significantly decreased average pore size, it is difficult to use the porous body for applications in which gas/liquid permeability is required (e.g. filter). For example, a diesel particulate filter (DPF) which traps particulate matter (PM) discharged from a diesel engine of a diesel car or the like preferably has an average pore size of 10 µm or more. If the 50% particle size is less than 10 µm, it may be difficult to obtain a porous body with such an average pore size.

If the 50% particle size exceeds the above range, a process may be hindered in which aggregate particles are sintered during firing to form a strong neck. As a result, the sintered product may exhibit a decreased mechanical strength or may break due to a decrease in the bonding force of the aggregate particles.

The term "x % particle size ($D_x$)" used herein means the particle size measured using a laser diffraction/scattering particle size distribution measurement device (e.g. "LA-920" manufactured by Horiba Ltd.) at which the cumulative mass of the granules is x % of the total mass of the granules. For example, the x % particle size ($D_x$)) may be measured using a method which includes dispersing 1 g of measurement target granules in 50 g of ion-exchanged water in a glass beaker by means of ultrasonic dispersion, diluting the resulting suspension to an appropriate concentration, injecting the diluted suspension into the cell of the measurement device, dispersing the granules for two minutes in the measurement device by means of ultrasonic dispersion, and then measuring the particle size, for example. In this measurement method, the "50% particle size ($D_{50}$)" indicates the average particle size.

It is preferable that the silica gel granules used for the second ceramic porous body have a particle size distribution defined by the following expressions (1) and (2) with respect to the 50% particle size ($D_{50}$). A porous body with a practical average pore size can be obtained by achieving the particle size distribution within this range to provide a sharp particle size distribution.

$$0.1 \leq D_{10}/D_{50} \leq 0.5 \quad (1)$$

$$2 \leq D_{90}/D_{50} \leq 5 \quad (2)$$

($D_{50}$: 50% particle size, $D_{10}$: 10% particle size, and $D_{90}$: 90% particle size)

If the ratio $D_{10}/D_{50}$ is less than the above range, since the resulting porous body exhibits a significantly decreased average pore size, it may be difficult to obtain a porous body with an average pore size of 10 µm or more. If the ratio $D_{10}/D_{50}$ exceeds the above range, the recovery rate decreases when sieving the silica gel granules used for the second ceramic porous body. In order to reliably achieve the above effects, the ratio $D_{10}/D_{50}$ is more preferably 0.2 to 0.5, and still more preferably 0.3 to 0.5.

If the ratio $D_{90}/D_{50}$ is less than the above range, the recovery rate decreases when sieving the silica gel granules used for the second ceramic porous body. If the value $D_{10}/D_{50}$ exceeds the above range, since the resulting porous body exhibits a significantly decreased average pore size, it may be difficult to obtain a porous body with an average pore size of 10 µm or more. In order to reliably achieve the above effects, the ratio $D_{90}/D_{50}$ is more preferably 2 to 4, and still more preferably 2 to 3.

The silica gel granules used for the second ceramic porous body preferably include particles with an aspect ratio of 1 to 5 in an amount of 90 to 100 mass %. If the content of particles with an aspect ratio of 1 to 5 is outside the above range, the roundness of pores formed after firing decreases, whereby the pressure loss increases during gas permeation. In order to reliably achieve the above effects, the silica gel granules more preferably include particles with an aspect ratio of 1 to 5 in an amount of 95 to 100 mass %, and particularly preferably 98 to 100 mass %.

The term "aspect ratio" generally refers to the ratio of the major axis to the minor axis of a particle. In this specification, the content of particles with an aspect ratio of 1 to 5 is determined as follows. Specifically, the silica gel granules are photographed using a scanning electron microscope. Fifty particles are arbitrarily selected from a 622×419-µm area of the photographed image, and the aspect ratio of each particle is calculated from the major axis and the minor axis. The ratio of particles with an aspect ratio of 1 to 5 to the fifty particles is taken as the content of particles with an aspect ratio of 1 to 5. In this case, the minimum particle size measured through the center of gravity of the particle is taken as the minor axis of the particle, and the maximum particle size measured through the center of gravity of the particle is taken as the major axis of the particle.

The silica gel granules used for the second ceramic porous body preferably do not substantially include particles with a particle size exceeding 100 µm. If the silica gel granules do not substantially include particles with a particle size exceeding 100 µm, a problem can be prevented in which large pores are formed in the porous body and act as defects. Moreover, when obtaining a formed product with a honeycomb structure provided with an extremely thin partition wall by extrusion forming, a problem can be effectively prevented in which the slit (portion extruded through the slit forms a partition wall) of an extrusion die is clogged to increase the extrusion pressure, for example.

The term "do not substantially include" used herein means that the content of particles with a particle size exceeding 100 µm is 0 to 0.01 mass %, that is, the content of particles with a particle size of 100 µm or less is 99.99 to 100 mass %.

The silica gel granules used for the second ceramic porous body are preferably formed of a porous body with a pore volume of 0.4 to 2.0 ml/g. If the pore volume is within the above range, pore-forming effects can be obtained to an extent corresponding to the amount of the silica gel granules added.

If the pore volume is less than the above range, it may be difficult to obtain sufficient pore-forming effects. If the pore volume exceeds the above range, since the granules exhibit a decreased mechanical strength, the particles are crushed during mixing/kneading the raw materials or during forming. As a result, pore-forming effects to an extent corresponding to the amount of the silica gel granules added may not be obtained. In order to reliably achieve the above effects, the pore volume is more preferably 0.6 to 2.0 ml/g, and particularly preferably 1.0 to 2.0 ml/g.

The term "pore volume" used herein means the pore volume measured using a mercury porosimeter ("Autopore 9405" manufactured by Micromeritics Instrument Corporation).

The silica gel granules used for the second ceramic porous body are preferably particles with a specific surface area (JIS R1626) of 100 to 1000 m$^2$/g. If the specific surface area is within the above range, sufficient pore-forming effects can be achieved while ensuring the mechanical strength of the resulting sintered product.

If the specific surface area is less than the above range, the pore-forming effects may be insufficient. If the specific surface area exceeds the above range, the resulting sintered product may exhibit a decreased mechanical strength. In order to reliably achieve the above effects, the specific surface area is more preferably 300 to 1000 $m^2/g$, and particularly preferably 600 to 1000 $m^2/g$.

The term "specific surface area" used herein means the specific surface area measured in accordance with JIS R1626 (Measuring methods for specific surface area of fine ceramic powders by gas adsorption using BET method).

The silica gel granules used for the second ceramic porous body are preferably obtained by sieving raw material granules with a 50% particle size ($D_{50}$) of 10 to 150 μm through a screen with a pore diameter of 44 to 210 μm to control the 50% particle size ($D_{50}$) within the range of 10 to 100 μm. The raw material granules more preferably have a 50% particle size of 10 to 120 μm.

If the 50% particle size of the raw material granules is less than the above range, granules with a 50% particle size of 10 μm or more may not be obtained by sieving. If the 50% particle size of the raw material granules exceeds the above range, granules with a 50% particle size of 100 μm or less may not be obtained by sieving. In order to obtain an appropriate particle size distribution described later in addition to the above 50% particle size, it is more preferable that the raw material granules have a 50% particle size of 25 to 100 μm, and particularly preferably 25 to 80 μm.

When producing the silica gel granules used for the second ceramic porous body, it is preferable to use raw material granules with a particle size distribution defined by the following expressions (3) and (4) with respect to the 50% particle size ($D_{50}$) in addition to the controlled 50% particle size.

$$0.05 \leq D_{10}/D_{50} \leq 0.5 \quad (3)$$

$$2.0 \leq D_{90}/D_{50} \leq 8.0 \quad (4)$$

($D_{50}$: 50% particle size, $D_{10}$: 10% particle size, and $D_{90}$: 90% particle size)

Granules with a particle size distribution defined by the following expression (1) can be obtained by using raw material granules with a ratio $D_{10}/D_{50}$ within the above range. In order to reliably achieve the above effects, it is more preferable to use raw material granules with a ratio $D_{10}/D_{50}$ of 0.07 to 0.5, and particularly preferably 0.08 to 0.5.

$$0.1 \leq D_{10}/D_{50} \leq 0.5 \quad (1)$$

Granules with a particle size distribution defined by the following expression (2) can be obtained by using raw material granules with a ratio $D_{10}/D_{50}$ within the above range. In order to reliably achieve the above effects, it is more preferable to use raw material granules with a ratio $D_{90}/D_{50}$ of 2 to 7, and particularly preferably 2 to 6.

$$2 \leq D_{90}/D_{50} \leq 5 \quad (2)$$

When producing the silica gel granules used for the second ceramic porous body, it is necessary to sieve the raw material granules through a screen with a pore diameter of 44 to 210 μm. The purpose of this operation is to obtain granules with a 50% particle size controlled in the range of 10 to 100 μm.

If the pore diameter of the screen is less than the above range, the ratio $D_{10}/D_{50}$ decreases. If the pore diameter of the screen exceeds the above range, it is difficult to remove large particles with a particle size exceeding 100 μm. In order to reliably achieve the above effects, it is more preferable to sieve the raw material granules through a screen with a pore diameter of 85 to 170 μm, and still more preferably 85 to 145 μm.

The sieving method is not particularly limited insofar as the raw material granules are sieved through a screen with the above pore diameter. A known sieving method such as a vibration sieving method, a centrifugal sieving method, or an air jet sieving method may be arbitrarily used. In particular, it is preferable to use the air jet sieving method.

Since the silica gel is a porous body and is a light-weight particle with a small apparent density, the silica gel easily rides an air current. Therefore, classification using the air jet sieving method is suitable for the silica gel. On the other hand, the light-weight silica gel particles may not be sufficiently classified using the vibration sieving method or the centrifugal sieving method. As the air jet sieving method, a method using an air jet classifier (e.g. "Fine Sifter MTS-D101" manufactured by Okawara Corporation) provided with a cylindrical screen with a specific pore diameter can be given in which the raw material granules are supplied to the internal space of the cylindrical screen together with an air current, and sieved through the cylindrical screen while absorbing the raw material granules from the outside of the cylindrical screen utilizing the force of the wind, for example. The above method improves production efficiency due to high classification performance.

The raw material granules may be obtained by adding an acid such as hydrochloric acid or sulfuric acid to sodium silicate (water glass: $SiO_2 \cdot Na_2O$) at 10 to 95° C. with vigorous stirring to allow the mixture to react to obtain a hydrogel, neutralizing the hydrogel with a base such as ammonium nitrate ($NH_4NO_3$), washing the resulting product with water, and drying and firing the resulting product at 20 to 150° C.

As an example of the method of producing raw material granules with a controlled 50% particle size, a method of adjusting the primary particle size by adjusting the pH during reaction can be given. When sodium silicate and an acid are reacted in an acid region with a pH of less than 7.0, dissociation of surface hydroxyl groups of the silica decreases, whereby silica gel granules with a small 50% particle size can be obtained. When sodium silicate and an acid are reacted in a base region with a pH exceeding 7.0, hydroxide ions ($OH^-$) act as a catalyst so that a siloxane bond is formed between the silica molecules, whereby silica gel granules with a large 50% particle size can be obtained. Note that raw material granules with a controlled 50% particle size may be obtained by grinding and classifying silica gel granules or arbitrarily selecting a commercially available silica gel product suitable for the objective.

Silica gel granules satisfying other conditions (e.g. particle size distribution, aspect ratio, pore volume, and specific surface area) suitable for the silica gel granules used for the second ceramic porous body may be arbitrarily selected from various commercially available silica gel products, or may be obtained by grinding and classifying such products.

The silica gel granules used for the second ceramic porous body may be mixed with raw materials such as aggregate particles (e.g. ceramic powder), dispersion medium (e.g. water), organic binder, and forming agent, for example. The resulting mixture is kneaded to obtain a clay, and the clay is formed into a desired shape by extrusion forming or the like, dried, and fired to obtain a ceramic porous body as a sintered product.

Since the silica gel granules used for the second ceramic porous body contain silica as the main component, the silica gel granules may be added as part of the aggregate particles when producing a ceramic porous body containing silica as the component. This method is advantages in that the aggregate particles act as the pore-forming agent to make it unnecessary to separately add the pore-forming agent.

For example, cordierite ($2MgO.2Al_2O_3.5SiO_2$) is obtained by mixing talc, kaolin, alumina, aluminum hydroxide, silica, and the like at a theoretical cordierite composition and firing the mixture. In this case, if the above silica gel granules are used instead of all or part of the silica, a cordierite porous body with a porosity and an average pore size suitable for the application can be obtained without separately adding the pore-forming agent, or a cordierite porous body with a high porosity can be obtained which cannot be obtained by merely performing a normal firing operation. As examples of the ceramic containing silica as the component, mullite, forsterite, fayalite, enstatite, silica glass, cristobalite, pottery, and the like can be given in addition to cordierite. These ceramic products can be produced by utilizing the effect of using the silica gel granules in the same manner as cordierite.

The shape of the first and second ceramic porous bodies according to the present invention is not particularly limited. The shape of the first and second ceramic porous bodies may be appropriately selected depending on the application. For example, when using the ceramic porous body for a filter, catalyst carrier, or the like, the ceramic porous body may be formed into a honeycomb shape suitable for these applications.

The first method of producing a formed product according to the present invention is a method of producing a formed product which produces a ceramic porous body upon firing, the method including adding silica gel granules or silica gel granules and water-absorbing polymer particles to a forming raw material to prepare a clay, and integrally forming the resulting ceramic clay into a formed product. The second method of producing a formed product according to the present invention is a method of producing a formed product which produces a ceramic porous body upon firing, the method including adding silica gel granules or silica gel granules and water-absorbing polymer particles to a forming raw material to prepare a clay, and forming the resulting ceramic clay into a formed product using a continuous forming machine.

The silica gel granules or the water-absorbing polymer particles exhibit high mechanical strength and are rarely crushed in comparison with hollow particles (e.g. resin foam) which have been widely used as the pore-forming agent. Therefore, even if the clay to which the silica gel granules or the water-absorbing polymer particles are added as the pore-forming agent is integrally formed into a hard formed product or formed using a continuous forming machine, the silica gel granules are not easily crushed during kneading, deaerating, or forming. Therefore, a ceramic porous body which exhibits a high porosity and does not show defects such as deformation can be obtained by firing the resulting formed product.

The silica gel granules may be individually added as the pore-forming agent, or may be added together with the water-absorbing polymer particles. When adding the silica gel granules together with the water-absorbing polymer particles, the silica gel granules and the water-absorbing polymer particles are preferably added so that the mass ratio of the silica gel granules to the water-absorbing polymer particles (mass of the silica gel granules/mass of water-absorbing polymer particles) is about 0.25 to 9. If the mass ratio is less than 0.25, carbon dioxide or toxic gas originating in combustibles are produced to a large extent during firing the formed product. Moreover, since it is necessary to prevent cracks during firing by reducing generation of heat during combustion of combustibles, the firing time is increased. If the mass ratio exceeds 9, although the pore-forming effects due to the addition of the water-absorbing polymer particles occur to only a small extent, the number of types of raw materials added is increased. This result in inefficient production.

Preferred forms of the silica gel granules are the same as the silica gel granules used for the second ceramic porous body. As the water-absorbing polymer particles, water-absorbing polymer particles with an average diameter after water absorption of 2 to 200 μm are preferable.

EXAMPLES

The present invention is described below in more detail by way of examples. Note that the present invention is not limited the following examples.

Examples 1 to 8 and Comparative Examples 1 and 2

A silica gel ("P707M" manufactured by Mizusawa Industrial Chemicals, Ltd., average particle size: 120 μm, bulk density: 0.45 g/cm$^3$) or a porous magnesium silicate powder ("P-1" manufactured by Mizusawa Industrial Chemicals, Ltd., average particle size: 15 μm, bulk density: 0.85 g/cm$^3$) was used as a pore-forming agent. The pore-forming agent was mixed with talc, silica, alumina, kaolin, and aluminum hydroxide at a cordierite composition while changing the amount of the silica gel in the range of 0 to 18 mass % and the amount of the porous magnesium silicate powder in the range of 0 to 40 mass %, as shown in Table 1, to prepare a forming raw material. After the addition of methylcellulose ("SM4000" manufactured by Shin-Etsu Chemical Co., Ltd.) as a forming binder, a surfactant as a forming agent, and water, the mixture was kneaded to prepare a ceramic clay. The amounts of the binder, forming agent, and water shown in Table 1 indicate the amounts for 100 mass % of the total amount of the forming raw material including the pore-forming agent. A honeycomb-shaped formed product (diameter: 40 mm, length: 100 mm) was formed by extrusion forming the resulting ceramic clay. The formed product was dried at 120° C. for one hour and fired at 1350° C. for two hours to obtain a ceramic porous body. The porosity of the resulting ceramic porous body was measured. The results are shown in Table 1.

TABLE 1

|  | Bulk density | Comparative Example 1 | Comparative Example 2 | Example 1 | Example 2 | Example 3 |
|---|---|---|---|---|---|---|
| Talc | 2.6 g/cm³ | 40.0 mass % | 0.0 mass % | 40.0 mass % | 40.0 mass % | 40.0 mass % |
| Kaolin | 2.6 g/cm³ | 19.0 mass % | 19.0 mass % | 19.0 mass % | 19.0 mass % | 19.0 mass % |
| Silica | 2.6 g/cm³ | 12.5 mass % | 12.5 mass % | 0.0 mass % | 2.5 mass % | 5.0 mass % |
| Alumina | 3.9 g/cm³ | 13.5 mass % | 13.5 mass % | 13.5 mass % | 13.5 mass % | 13.5 mass % |
| Aluminum hydroxide | 2.8 g/cm³ | 15.0 mass % | 15.0 mass % | 15.0 mass % | 15.0 mass % | 15.0 mass % |
| Silica gel | 0.45 g/cm³ | 0.0 mass % | 0.0 mass % | 12.5 mass % | 10.0 mass % | 7.5 mass % |
| Porous magnesium silicate | 0.85 g/cm³ | 0.0 mass % | 40.0 mass % | 0.0 mass % | 0.0 mass % | 0.0 mass % |
| Binder | 1.1 g/cm³ | 4.0 mass % | 4.0 mass % | 4.0 mass % | 4.0 mass % | 4.0 mass % |
| Forming agent | 1.0 g/cm³ | 0.5 mass % | 0.5 mass % | 0.5 mass % | 0.5 mass % | 0.5 mass % |
| Water | 1.0 g/cm³ | 35.0 mass % | 81.0 mass % | 48.6 mass % | 47.0 mass % | 42.0 mass % |
| Porosity |  | 45.0% | 48.8% | 56.1% | 55.4% | 53.0% |

|  | Example 4 | Example 5 | Example 6 | Example 7 | Example 8 |
|---|---|---|---|---|---|
| Talc | 40.0 mass % | 40.0 mass % | 40.0 mass % | 20.0 mass % | 10.0 mass % |
| Kaolin | 19.0 mass % | 19.0 mass % | 8.0 mass % | 19.0 mass % | 19.0 mass % |
| Silica | 7.5 mass % | 10.5 mass % | 0.0 mass % | 12.5 mass % | 12.5 mass % |
| Alumina | 13.5 mass % | 13.5 mass % | 19.0 mass % | 13.5 mass % | 13.5 mass % |
| Aluminum hydroxide | 15.0 mass % | 15.0 mass % | 15.0 mass % | 15.0 mass % | 15.0 mass % |
| Silica gel | 5.0 mass % | 2.0 mass % | 18.0 mass % | 0.0 mass % | 0.0 mass % |
| Porous magnesium silicate | 0.0 mass % | 0.0 mass % | 0.0 mass % | 20.0 mass % | 30.0 mass % |
| Binder | 4.0 mass % | 4.0 mass % | 4.0 mass % | 4.0 mass % | 4.0 mass % |
| Forming agent | 0.5 mass % | 0.5 mass % | 0.5 mass % | 0.5 mass % | 0.5 mass % |
| Water | 39.0 mass % | 36.5 mass % | 39.0 mass % | 58.0 mass % | 69.5 mass % |
| Porosity | 51.4% | 50.0% | 53.5% | 58.2% | 58.3% |

As shown in Table 1, when using the silica gel as the pore-forming agent, the porosity increased accompanying an increase in the amount of the silica gel when the amount of the silica gel was about 12.5 mass % (28 vol %) or less. When the amount of the silica gel was 18 mass % (41 vol %), the amount of shrinkage of the formed product during firing increased, whereby the porosity decreased in comparison with the case where the amount of the silica gel was 12.5 mass %. When using the porous magnesium silicate powder as the pore-forming agent, a high porosity was obtained when the amount of the porous magnesium silicate powder was about 30 mass % (35.3 vol %) or less. When the amount of the porous magnesium silicate powder was 40 mass % (47 vol %), the amount of shrinkage of the formed product during firing increased, whereby the porosity decreased to a large extent.

Examples 9 and 10 and Comparative Examples 3 and 4

The state of the formed product and the porosity of the resulting ceramic porous body were compared between the case of using a silica gel ("P707M" manufactured by Mizusawa Industrial Chemicals, Ltd., average particle size: 120 μm, bulk density: 0.45 g/cm³) and the case of using a resin foam ("Microsphere F-50E" manufactured by Matsumoto Yushi-Seiyaku Co., Ltd.) while changing the kneading time when preparing a ceramic clay. The results are shown in Table 2. The amount of each raw material and the like are shown in Table 2. Preparation of the ceramic clay, forming method, shape of the formed product, drying and firing methods, and the like were the same as described above (Examples 1 to 8 and Comparative Examples 1 and 2). In regard to the state of the formed product, a case where the formed product showed an excellent surface state without fine-split defects was evaluated as "Good", a case where fine-split defects were observed to some extent on the surface of the formed product was evaluated as "Fair", and a case where significant fine-split defects were observed on the surface of the formed product was evaluated as "Bad".

TABLE 2

|  | Bulk density | Comparative Example 3 | Comparative Example 4 | Example 9 | Example 10 |
|---|---|---|---|---|---|
| Talc | 2.6 g/cm³ | 40.0 mass % | 40.0 mass % | 40.0 mass % | 40.0 mass % |
| Kaolin | 2.6 g/cm³ | 19.0 mass % | 19.0 mass % | 19.0 mass % | 19.0 mass % |
| Silica | 2.6 g/cm³ | 12.5 mass % | 12.5 mass % | 0.0 mass % | 0.0 mass % |
| Alumina | 3.9 g/cm³ | 13.5 mass % | 13.5 mass % | 13.5 mass % | 13.5 mass % |
| Aluminum hydroxide | 2.8 g/cm³ | 15.0 mass % | 15.0 mass % | 15.0 mass % | 15.0 mass % |
| Silica gel | 0.45 g/cm³ | 0.0 mass % | 0.0 mass % | 12.5 mass % | 12.5 mass % |

TABLE 2-continued

|  | Bulk density | Comparative Example | | Example | |
|---|---|---|---|---|---|
|  |  | 3 | 4 | 9 | 10 |
| Resin foam | 0.03 g/cm³ | 2.5 mass % | 2.5 mass % | 2.5 mass % | 2.5 mass % |
| Binder | 1.1 g/cm³ | 4.0 mass % | 4.0 mass % | 4.0 mass % | 4.0 mass % |
| Forming agent | 1.0 g/cm³ | 0.5 mass % | 0.5 mass % | 0.5 mass % | 0.5 mass % |
| Water | 1.0 g/cm³ | 35.0 mass % | 35.0 mass % | 48.6 mass % | 48.6 mass % |
| Kneading time |  | 30 min | 60 min | 30 min | 60 min |
| Forming state |  | Bad | Good | Fair | Good |
| Porosity |  | 58.0% | 51.2% | 56.1% | 56.3% |

As shown in Table 2, a high porosity can be obtained by adding the resin foam as the pore-forming agent. On the other hand, it is necessary to increase the kneading time when preparing the ceramic clay in order to obtain an excellent forming state, whereby the porosity decreases. When using the silica gel as the pore-forming agent, a change in porosity due to an increase in the kneading time is small, whereby an excellent formed product can be obtained while maintaining a high porosity.

Examples 11 to 18 and Comparative Examples 5 and 6

Silica gel granules with different 50% particle sizes $D_{50}$ were provided. The silica gel granules contained particles with an aspect ratio of 1 to 5 in an amount of 90 to 100 mass %, had a specific surface area of 100 to 1000 m²/g, and contained silicon in an amount of 95 mol % or more of the total number of moles of metal elements. The silica gel granules, talc (average particle size: 15 μm), kaolin (average particle size: 7 μm), and alumina (average particle size: 2 μm) were mixed as ceramic raw materials at a cordierite composition ($2MgO \cdot 2Al_2O_3 \cdot 5SiO_2$).

5 parts by mass of methylcellulose powder as an organic binder was added to 100 parts by mass of the ceramic raw materials, and the components were dry-mixed. The silica gel granules had a pore volume of 1 ml/g. The amount of the silica gel granules was 13 mass % of the total mass of the ceramic raw materials.

The mixture was kneaded using a sigma kneader to obtain a clay. The clay was extruded using a vacuum kneader to obtain a clay formed in the shape of a column (outer diameter: 50 mm). A plunger with an outer diameter of 60 mm provided with a honeycomb forming die in which slits with a width of 0.3 mm and a pitch of 1.8 mm were formed in a lattice was provided. The plunger was charged with the columnar clay, and the clay was extruded to obtain a honeycomb formed product in which a number of cells were partitioned and formed by partition walls. The honeycomb formed product had an outer diameter of 40 mm and a length of 60 mm.

The honeycomb formed product was dried at 60 to 80° C. and fired at 1380 to 1430° C. to obtain a cordierite porous body. The cordierite porous body had an outer diameter of 38 mm, a length of 55 mm, a square cell shape with a side length of about 1.8 mm, a partition wall thickness of 0.3 mm, and a cell density of about 30 cells per cm². The porosity and the average pore size of the cordierite porous body were measured. The results are shown in Table 3 and FIG. 1. The porosity and the average pore size were measured using a mercury porosimeter ("Autopore 9405" manufactured by Micromeritics Instrument Corporation).

TABLE 3

|  |  |  | Comparative Example 5 | Example 11 | Example 12 | Example 13 | Example 14 | Example 15 | Example 16 | Example 17 | Example 18 | Comparative Example 6 |
|---|---|---|---|---|---|---|---|---|---|---|---|---|
| Pore-forming agent | $D_{10}$ | (μm) | 0.7 | 2 | 1.5 | 2.5 | 5 | 7.5 | 5 | 10 | 18 | 25 |
|  | $D_{50}$ |  | 7 | 10 | 25 | 25 | 25 | 25 | 50 | 80 | 100 | 150 |
|  | $D_{90}$ |  | 35 | 52 | 140 | 125 | 75 | 50 | 200 | 350 | 360 | 420 |
|  | $D_{10}/D_{50}$ |  | 0.1 | 0.2 | 0.06 | 0.1 | 0.2 | 0.3 | 0.1 | 0.13 | 0.18 | 0.17 |
|  | $D_{90}/D_{50}$ |  | 5 | 5.2 | 5.6 | 5 | 3 | 2 | 4 | 4.4 | 3.6 | 2.8 |
| Porous body | Porosity | (vol %) | 48 | 51 | 52 | 48 | 49 | 53 | 52 | 51 | 50 | — |
|  | Average pore size | (μm) | 3 | 10 | 10 | 16 | 18 | 24 | 27 | 31 | 40 | — |

*In Comparative Example 6, since the formed product broke during firing, a porous body could not be obtained.

The cordierite porous bodies of Examples 11 to 18, in which the silica gel granules with a 50% particle size of 10 to 100 μm were used as the pore-forming agent, had an average pore size of 10 μm or more which is required for a DPF.

The cordierite porous body of Comparative Example 5, in which the silica gel granules with a 50% particle size of less than 10 μm were used as the pore-forming agent, had an average pore size of less than 10 μm. That is, the average pore size of 10 μm or more which is required for a DPF could not be obtained. In Comparative Example 6 in which the silica gel granules with a 50% particle size exceeding 100 μm were used as the pore-forming agent, since the formed product broke during firing, a cordierite porous body could not be obtained.

Examples 19 to 21

Silica gel granules with different values for $D_{50}$, $D_{10}/D_{50}$, or $D_{90}/D_{50}$ were provided. These silica gel granules were used as raw material granules. The raw material granules were sieved through a screen with a pore diameter of 145 µm. Cordierite porous bodies were obtained in the same manner as in Example 11 using the sieved silica gel granules as the pore-forming agent. The porosity and the average pore size of the resulting cordierite porous bodies were measured. The results are shown in Table 4. The raw material granules were sieved using an air jet classifier ("Fine Sifter MTS-D101" manufactured by Okawara Corporation) provided with a cylindrical screen with a pore diameter of 145 µm. The raw material granules were supplied to the internal space of the cylindrical screen, and sieved while absorbing the raw material granules from the outside of the cylindrical screen utilizing the force of the wind.

TABLE 4

|  |  |  | Example 19 | Example 20 | Example 21 |
|---|---|---|---|---|---|
| Pore-forming agent (before classification) | $D_{10}$ | (µm) | 2.7 | 2.8 | 7.6 |
|  | $D_{50}$ |  | 29 | 26 | 26 |
|  | $D_{90}$ |  | 132 | 95 | 55 |
|  | $D_{10}/D_{50}$ |  | 0.09 | 0.11 | 0.29 |
|  | $D_{90}/D_{50}$ |  | 4.6 | 3.7 | 2.1 |
| Pore-forming agent (after classification) | $D_{10}$ | (µm) | 2.5 | 2.7 | 7.5 |
|  | $D_{50}$ |  | 25 | 24 | 25 |
|  | $D_{90}$ |  | 115 | 75 | 50 |
|  | $D_{10}/D_{50}$ |  | 0.1 | 0.11 | 0.3 |
|  | $D_{90}/D_{50}$ |  | 4.4 | 3.1 | 2 |
| Porous body | Porosity | (vol %) | 48 | 49 | 53 |
|  | Average pore size | (µm) | 10 | 16 | 24 |

The ratio $D_{10}/D_{50}$ of the silica gel granules of Example 19, which had a ratio $D_{10}/D_{50}$ of less than 0.1 before sieving, was controlled in the range of 0.1 to 0.5 through sieving. The silica gel granules of Examples 20 and 21 had a ratio $D_{10}/D_{50}$ of 0.1 to 0.5 and a ratio $D_{90}/D_{50}$ of 2 to 5. The particle size distributions of the silica gel granules of Examples 20 and 21 became sharp by sieving.

Examples 22 to 26

Cordierite porous bodies were obtained in the same manner as in Example 11 using silica gel granules with different values for $D_{10}/D_{50}$ or $D_{90}/D_{50}$. The porosity and the average pore size of the cordierite porous bodies were measured. The results are shown in Table 5.

The cordierite porous bodies of Examples 23 to 26 in which the silica gel granules with a ratio $D_{10}/D_{50}$ of 0.1 to 0.5 and a ratio $D_{90}/D_{50}$ of 2 to 5 were used as the pore-forming agent had an average pore size of 10 µm or more which is required for a DPF.

The cordierite porous body of Example 22, in which the silica gel granules with a ratio $D_{10}/D_{50}$ and a ratio $D_{90}/D_{50}$ outside the above ranges were used as the pore-forming agent, had a significantly reduced average pore size for the particle size of the silica gel used. As a result, the cordierite porous body of Example 22 had an average pore size of 10 µm which is the lower limit required for a DPF.

Examples 27 to 33

Silica gel granules with different pore volumes were provided. The microcompressive strength of the silica gel granules was measured to evaluate the mechanical strength of the granules. The results are shown in Table 6. The silica gel granules were kneaded for one hour using a sigma kneader, and sieved through a screen with a pore diameter of 44 µm. The percentage of the silica gel granules remaining on the screen was confirmed to evaluate the mechanical strength of the granules. Cordierite porous bodies were obtained in the same manner as in Example 11 using these silica gel granules. The porosity and the average pore size of the resulting cordierite porous bodies were measured. The results are shown in Table 6. The microcompressive strength was measured using a microcompression tester ("MCTE-200" manufactured by Shimadzu Corporation).

TABLE 5

|  |  |  | Example 22 | Example 23 | Example 24 | Example 25 | Example 26 |
|---|---|---|---|---|---|---|---|
| Pore-forming agent | $D_{10}$ | (µm) | 1.5 | 2.5 | 5.8 | 7.5 | 12.5 |
|  | $D_{50}$ |  | 25 | 25 | 24 | 27 | 25 |
|  | $D_{90}$ |  | 140 | 125 | 75 | 62 | 50 |
|  | $D_{10}/D_{50}$ |  | 0.06 | 0.10 | 0.24 | 0.28 | 0.5 |
|  | $D_{90}/D_{50}$ |  | 5.6 | 5.2 | 3.1 | 2.3 | 2 |
| Porous body | Porosity | (vol %) | 52 | 48 | 50 | 53 | 52 |
|  | Average pore size | (µm) | 10 | 17 | 18 | 19 | 25 |

TABLE 6

|  |  |  | Example 27 | Example 28 | Example 29 | Example 30 | Example 31 | Example 32 | Example 33 |
|---|---|---|---|---|---|---|---|---|---|
| Pore-forming agent | $D_{10}$ | (μm) | 6.8 | 7 | 6.9 | 7.5 | 7.3 | 6.8 | 7.3 |
|  | $D_{50}$ |  | 26 | 26 | 23 | 25 | 22 | 22 | 25 |
|  | $D_{90}$ |  | 66 | 65 | 59 | 61 | 58 | 59 | 60 |
|  | $D_{10}/D_{50}$ |  | 0.26 | 0.27 | 0.3 | 0.3 | 0.33 | 0.31 | 0.29 |
|  | $D_{90}/D_{50}$ |  | 2.5 | 2.5 | 2.6 | 2.4 | 2.6 | 2.7 | 2.4 |
|  | Pore volume | (ml/g) | 0.2 | 0.4 | 0.6 | 1 | 1.5 | 2 | 2.2 |
|  | Microcompressive strength | (g/f) | 8 | 7.5 | 5.5 | 5 | 4.5 | 4 | 3 |
| Porous body | Porosity | (vol %) | 30 | 40 | 45 | 52 | 55 | 60 | 65 |
|  | Average pore size | (μm) | 17 | 18 | 20 | 25 | 22 | 21 | 21 |

As shown in Table 6, a strong correlation was observed between the pore volume and the microcompressive strength. In more detail, the granules with a small pore volume exhibited a high microcompressive strength, and the granules with a large pore volume exhibited a low microcompressive strength.

The cordierite porous bodies of Examples 28 to 32, in which the silica gel granules with a pore volume of 0.4 to 2.0 ml/g were used as the pore-forming agent, had a porosity of 40 vol % or more which is required for a DPF.

It was confirmed that the silica gel granules of Example 32 with a pore volume exceeding 2.0 ml/g broke. The porous body obtained using the silica gel granules of Example 27 with a pore volume of less than 0.4 ml/g had a low porosity. It was confirmed that it may be difficult to obtain sufficient pore-forming effects using the silica gel granules of Example 27.

Examples 34 to 39

Silica gel granules with different pore volumes were provided. Cordierite porous bodies were obtained in the same manner as in Example 11 while changing the amount of the silica gel granules. The porosity and the average pore size of the resulting cordierite porous bodies were measured. The results are shown in Table 7.

The silica gel granules of Examples 37 to 39 with a pore volume of 0.4 to 2.0 ml/g exhibited a porosity of 40 vol % or more required for a DPF in the range of 5 to 24 mass % of the total mass of the ceramic raw materials.

The silica gel granules of Examples 34 to 36 with a pore volume of less than 0.4 ml/g could not ensure a porosity of 40 vol % or more required for a DPF, even if the amount of the pore-forming agent was increased to 24 mass % of the total mass of the ceramic raw materials. It was confirmed that it may be difficult to obtain sufficient pore-forming effects using the silica gel granules of Examples 34 to 36.

Examples 40 to 42

Silica gel granules differing in the content of large particles with a particle size exceeding 100 μm were provided. A columnar clay was obtained in the same manner as in Example 11 using these silica gel granules. A plunger with an outer diameter of 60 mm provided with a die in which a strip-shaped slit with a length of 2 mm and a width of 0.3 mm was formed was provided. The plunger was charged with the columnar clay, and the clay was extruded. The clay was continuously extruded for 20 minutes at a rate of 12 mm/s. Table 8 shows the results of the initial extrusion pressure and the extrusion pressure after 20 minutes. The content of large particles was calculated as follows. The silica gel granules were suspended in water, and sieved through a screen with a pore diameter of 105 μm (wet classification). The content of large particles was calculated from the amount of silica gel granules remaining on the screen.

TABLE 7

|  |  | Example 34 | Example 35 | Example 36 | Example 37 | Example 38 | Example 39 |
|---|---|---|---|---|---|---|---|
| $D_{10}$ | (μm) | 6.8 | 6.8 | 6.8 | 7 | 7 | 7 |
| $D_{50}$ |  | 26 | 26 | 26 | 26 | 26 | 26 |
| $D_{90}$ |  | 66 | 66 | 66 | 65 | 65 | 65 |
| $D_{10}/D_{50}$ |  | 0.26 | 0.26 | 0.26 | 0.27 | 0.27 | 0.27 |
| $D_{90}/D_{50}$ |  | 2.5 | 2.5 | 2.5 | 2.5 | 2.5 | 2.5 |
| Pore volume | (ml/g) | 0.2 | 0.2 | 0.2 | 0.4 | 0.4 | 0.4 |
| Microcompressive strength | (g/f) | 8 | 8 | 8 | 7.5 | 7.5 | 7.5 |
| Amount | (mass %) | 13 | 18 | 24 | 5 | 13 | 24 |
| Porosity | (vol %) | 30 | 33 | 38 | 40 | 42 | 46 |
| Average pore size | (μm) | 19 | 20 | 18 | 20 | 20 | 19 |

TABLE 8

|  |  |  | Example 40 | Example 41 | Example 42 |
|---|---|---|---|---|---|
| Pore-forming agent | $D_{10}$ | (μm) | 7.5 | 6.8 | 6.8 |
|  | $D_{50}$ |  | 25 | 25 | 27 |

TABLE 8-continued

|  |  |  | Example 40 | Example 41 | Example 42 |
|---|---|---|---|---|---|
|  | $D_{90}$ |  | 61 | 66 | 71 |
|  | $D_{10}/D_{50}$ |  | 0.3 | 0.27 | 0.25 |
|  | $D_{90}/D_{50}$ |  | 2.4 | 2.6 | 2.6 |
|  | Large particle | (mass %) | 0.005 | 0.01 | 0.03 |
|  | Pore volume | (ml/g) | 1 | 1.1 | 1 |
| Forming | Initial extrusion pressure | (MPa) | 4 | 5 | 5 |
|  | Extrusion pressure after 20 min | (MPa) | 4 | 6 | 15 |

The silica gel granules of Examples 40 and 41, which did not substantially include large particles (i.e. the content of large particles was 0 to 0.01 mass % and the content of particles with a particle size of 100 μm or less was 99.99 to 100 mass %), showed almost no difference between the initial extrusion pressure and the extrusion pressure after 20 minutes. Specifically, an increase in the extrusion pressure was not observed.

When using the silica gel granules of Example 42 of which the content of large particles exceeded 0.01 mass % (i.e. the content of particles with a particle size of 100 μm or less was 99.99 mass % or less), the extrusion pressure after 20 minutes was three times the initial extrusion pressure, whereby the formability deteriorated.

Examples 43 and 44 and Comparative Example 7

Silica gel granules, water-absorbing polymer particles, and a resin foam with 50% particle sizes $D_{50}$ and the like shown in Table 9 were provided as pore-forming agents. The pore-forming agent was added to talc (average particle size: 15 μm), kaolin (average particle size: 7 μm), and alumina (average particle size: 2 μm) in an amount shown in Table 9, and the components were mixed at a cordierite composition ($2MgO.2Al_2O_3.5SiO_2$). 5 parts by mass of methylcellulose powder as an organic binder was added to 100 parts by mass of the resulting ceramic raw material, and the components were dry-mixed. The mixture was kneaded using a sigma kneader to obtain a clay. The clay was extruded using a vacuum kneader to obtain a clay formed in the shape of a column (outer diameter: 200 mm). A plunger with an outer diameter of 200 mm provided with a honeycomb forming die in which slits with a width of 0.3 mm and a pitch of 1.8 mm were formed in a lattice was provided. The plunger was charged with the columnar clay, and the clay was extruded to obtain a honeycomb formed product in which a number of cells were partitioned and formed by partition walls. The honeycomb formed product had an outer diameter of 145 mm and a length of 180 mm.

The honeycomb formed product was subjected to dielectric drying and oven drying using a hot blast. The dried product was cut to a length of 153 mm using two parallel metal bonded diamond wheels and fired at 1380 to 1430° C. to obtain a cordierite porous body. The cordierite porous body had an outer diameter of 144 mm, a length of 152 mm, a square cell shape with a side length of about 1.8 mm, a partition wall thickness of 0.3 mm, and a cell density of about 30 cells per cm². The roundness, porosity, and average pore size of the resulting cordierite porous body were measured. The results are shown in Table 9. The roundness was determined as follows. The cordierite porous body was placed upright on a platen. The diameter of the cordierite porous body was measured at positions 5 to 10 mm from the upper and lower ends and at the center of the product in the lengthwise direction using an optical gauge to determine the minimum diameter and the maximum diameter at each position. The difference between the maximum diameter and the minimum diameter (maximum diameter−minimum diameter) was calculated for each position, and the largest difference between the maximum diameter and the minimum diameter was taken as the roundness.

TABLE 9

|  |  |  | Example 43 | Example 44 | Comparative example 7 |
|---|---|---|---|---|---|
| Silica gel | Amount | (mass %) | 13 | 13 | 0 |
|  | $D_{10}$ | (μm) | 6.8 | 6.8 | — |
|  | $D_{50}$ |  | 22 | 22 | — |
|  | $D_{90}$ |  | 59 | 59 | — |
|  | $D_{10}/D_{50}$ |  | 0.31 | 0.31 | — |
|  | $D_{90}/D_{50}$ |  | 2.7 | 2.7 | — |
|  | Pore volume | (ml/g) | 2 | 2 | — |
| Water-absorbing polymer | Amount | (mass %) | 0 | 2 | 0 |
|  | Water absorption factor | (g/g) | — | 20 | — |
|  | $D_{50}$ (after absorption) | (μm) | — | 50 | — |
| Resin foam | Amount | (mass %) | 0 | 0 | 1.5 |
|  | $D_{50}$ | (μm) | — | — | 40 |
| Porous body | Roundness | (mm) | 0.2 | 0.3 | 2.8 |
|  | Porosity | (vol %) | 60 | 65 | 60 |
|  | Average pore size | (μm) | 21 | 23 | 23 |

When forming the honeycomb formed product using the plunger forming machine, an excellent roundness was obtained in Examples 43 and 44, in which the silica gel granules or the silica gel granules and the water-absorbing polymer were used as the pore-forming agent, in comparison with Comparative Example 7 in which the resin foam was used as the pore-forming agent. A high porosity was also obtained in Examples 43 and 44.

Examples 45 and 46 and Comparative Example 8

Silica gel granules, water-absorbing polymer particles, and a resin foam with 50% particle sizes $D_{50}$ and the like shown in Table 10 were provided as pore-forming agents. The pore-forming agent was added to talc (average particle size: 15 μm), kaolin (average particle size: 7 μm), and alumina (average particle size: 2 μm) in an amount shown in Table 10, and the components were mixed at a cordierite composition ($2MgO.2Al_2O_3.5SiO_2$). 5 parts by mass of methylcellulose powder as an organic binder was added to 100 parts by mass of the resulting ceramic raw material, and the components were dry-mixed. The components were then wet-mixed while adding water. The above mixture was supplied to a two-axle continuous forming machine provided with a honeycomb forming die in which slits with a width of 0.3 mm and a pitch of 1.8 mm were formed in a lattice. The mixture was continuously prepared into clay and extruded to obtain a honeycomb formed product in which a number of cells were partitioned and formed by partition walls. The honeycomb formed product had an outer diameter of 145 mm and a length of 180 mm.

The resulting honeycomb formed product was dried, cut, and fired in the same manner as in Example 43 to obtain a cordierite porous body. The roundness, porosity, and average pore size of the resulting cordierite porous body were measured in the same manner as in Example 43. The results are shown in Table 10.

TABLE 10

| | | | Example 45 | Example 46 | Comparative example 8 |
|---|---|---|---|---|---|
| Silica gel | Amount | (mass %) | 13 | 13 | 0 |
| | $D_{10}$ | (μm) | 6.8 | 6.8 | — |
| | $D_{50}$ | | 22 | 22 | — |
| | $D_{90}$ | | 59 | 59 | — |
| | $D_{10}/D_{50}$ | | 0.31 | 0.31 | — |
| | $D_{90}/D_{50}$ | | 2.7 | 2.7 | — |
| | Pore volume | (ml/g) | 2 | 2 | — |
| Water-absorbing polymer | Amount | (mass %) | 0 | 2 | 0 |
| | Water absorption factor | (g/g) | — | 20 | — |
| | $D_{50}$ (after absorption) | (μm) | — | 50 | — |
| Resin foam | Amount | (mass %) | 0 | 0 | 1.5 |
| | $D_{50}$ | (μm) | — | — | 40 |
| Porous body | Roundness | (mm) | 0.2 | 0.3 | 1.6 |
| | Porosity | (vol %) | 60 | 65 | 39 |
| | Average pore size | (μm) | 21 | 23 | 15 |

When producing the honeycomb formed product using the continuous forming machine, an excellent roundness and a high porosity were obtained in Examples 45 and 46, in which the silica gel granules or the silica gel granules and the water-absorbing polymer were used as the pore-forming agent, in comparison with Comparative Example 8 in which the resin foam was used as the pore-forming agent. In Comparative Example 8, most bubbles of the resin foam were crushed during forming using the continuous forming machine, whereby the porosity significantly decreased.

INDUSTRIAL APPLICABILITY

The ceramic porous body according to the present invention can be suitably used for filters, catalyst carriers, and the like. For example, the ceramic porous body can be suitably used for an exhaust gas purifying device provided in a heat engine such as an internal combustion engine or combustion equipment such as a boiler, a liquid fuel/gaseous fuel reforming device, a service water/sewage purification device, and the like.

The invention claimed is:

1. A method of producing a ceramic porous body having partition walls, the ceramic porous body comprising cordierite, the method comprising:
    adding a porous silica powder having a bulk density of 0.2 to 1 g/cm³ or a porous silica-containing compound powder having a bulk density of 0.2 to 1 g/cm³ to a forming raw material to prepare a ceramic clay, in an amount of 5 to 40 vol. % in the total amount of the forming raw material so as to make the porous silica powder or the porous silica-containing compound powder work sufficiently as a pore-forming material and as at least a part of an Si-source for forming a cordierite in the ceramic clay,
    forming the resulting ceramic clay into a specific shape, and
    firing the formed ceramic clay so as to convert a material of the ceramic clay to cordierite
    wherein the partition walls have pores and porosity of at least 50%, said pores being formed mainly by virtue of the porous silica powder or the porous silica-containing compound powder
    wherein the porous silica powder is a silica gel and the porous silica-containing compound powder is a magnesium silicate.

2. The method according to claim 1, wherein the porous silica powder or the porous silica-containing compound powder has been melted during the firing.

3. The method according to claim 1, wherein the ceramic porous body has a honeycomb shape.

4. The method according to claim 1, wherein the adding step includes:
    adding silica gel granules with a 50% particle size ($D_{50}$) of 10 to 100 μm to a the forming raw material to prepare the ceramic clay.

5. The method according to claim 4, wherein the silica gel granules have a particle size distribution defined by the following expressions (1) and (2) with respect to the 50% particle size ($D_{50}$):

$$0.1 \leq D_{10}/D_{50} \leq 0.5 \quad (1)$$

$$2 \leq D_{90}/D_{50} \leq 5 \quad (2)$$

where, $D_{50}$: 50% particle size, $D_{10}$: 10% particle size, and $D_{90}$: 90% particle size.

6. The method according to claim 4, wherein the silica gel granules include particles with an aspect ratio of 5 or less in an amount of 90 mass % or more.

7. The method according to claim 4, wherein the silica gel granules do not substantially include particles with a particle size exceeding 100 μm.

8. The method according to claim 4, wherein the silica gel granules are formed of a porous body with a pore volume of 0.4 to 2.0 ml/g.

9. The method according to claim 4, wherein the silica gel granules are particles with a specific surface area (JIS R1626) of 100 to 100 m²/g.

10. The method according to claim 4, wherein Si accounts for 95 to 99.99 mol % of the total metal elements of the silica gel.

11. The method according to claim 4, wherein the silica gel granules are obtained by sieving silica gel raw material granules with a 50% particle size ($D_{50}$) of 10 to 150 μm through a screen with a pore diameter of 44 to 210 μm to control the 50% particle size ($D_{50}$) within a range of 10 to 100 μm.

12. The method according to claim 11, wherein granules having a particle size distribution defined by the following expressions (3) and (4) with respect to the 50% particle size ($D_{50}$) are used as the silica gel raw material granules:

$$0.05 \leq D_{10}/D_{50} \leq 0.5 \quad (3)$$

$$2 \leq D_{90}/D_{50} \leq 8 \quad (4)$$

where, $D_{50}$: 50% particle size, $D_{10}$: 10% particle size, and $D_{90}$: 90% particle size.

13. The method according to claim 11, wherein the silica gel granules are sieved using an air jet sieving method.

14. A method for producing a ceramic porous body according to claim 1, wherein water-absorbing polymer particles are further added to the forming raw material when the porous silica powder is added, and integrally forming the resulting ceramic clay into a the ceramic porous body.

15. A method for producing a ceramic porous body according to claim 1, wherein water-absorbing polymer particles are further added to the forming raw material when the porous silica powder is added, and forming the resulting ceramic clay into the ceramic porous body using a continuous forming machine.

16. The method according to claim 1, wherein Si accounts for 95 to 99.99 mol % of the total metal elements of the silica gel.

* * * * *